United States Patent
Bohnert

(10) Patent No.: US 11,322,114 B2
(45) Date of Patent: May 3, 2022

(54) CONTROL OF DISPLAY DIRECTING CONTENT OUTSIDE OF A VEHICLE

(71) Applicant: UVERTZ, LLC, Beverly Hills, CA (US)

(72) Inventor: Christopher M. Bohnert, Austin, TX (US)

(73) Assignee: UVERTZ, LLC, Beverly Hills, CA (US)

( * ) Notice: Subject to any disclaimer, the term of this patent is extended or adjusted under 35 U.S.C. 154(b) by 0 days.

(21) Appl. No.: 17/006,610

(22) Filed: Aug. 28, 2020

(65) Prior Publication Data

US 2022/0068237 A1 Mar. 3, 2022

(51) Int. Cl.
| | | |
|---|---|---|
| *G09G 5/10* | (2006.01) | |
| *G09F 21/04* | (2006.01) | |
| *B60R 13/00* | (2006.01) | |
| *G09F 9/35* | (2006.01) | |
| *G09F 9/33* | (2006.01) | |

(52) U.S. Cl.
CPC .............. *G09G 5/10* (2013.01); *B60R 13/00* (2013.01); *G09F 21/048* (2013.01); *G09F 9/33* (2013.01); *G09F 9/35* (2013.01); *G09G 2310/08* (2013.01); *G09G 2320/0626* (2013.01); *G09G 2360/145* (2013.01)

(58) Field of Classification Search
CPC ............... G09G 5/10; G09G 2310/08; G09G 2320/0626; G09G 2360/145; B06R 13/00; G09F 21/048; G09F 9/33; G09F 9/35
See application file for complete search history.

(56) References Cited

U.S. PATENT DOCUMENTS

| | | | |
|---|---|---|---|
| 7,821,388 B1 | 10/2010 | Booth et al. | |
| 8,754,426 B2 | 6/2014 | Marx | |
| 8,875,426 B2 | 11/2014 | Wagner | |
| 9,519,149 B2* | 12/2016 | Lee | G02B 27/0179 |
| 9,585,265 B2 | 2/2017 | Ganim | |
| 10,181,308 B2* | 1/2019 | Irzyk | G02B 27/0101 |
| 10,416,947 B2 | 9/2019 | Zenoff | |
| 10,744,934 B2* | 8/2020 | Anderson | F21K 9/278 |
| 10,752,112 B2* | 8/2020 | Mizukoshi | B60K 35/00 |
| 10,754,153 B2* | 8/2020 | Toki | G09G 5/38 |
| 10,762,809 B1* | 9/2020 | DeLorean | G08G 1/052 |
| 2005/0083183 A1 | 4/2005 | Cao et al. | |
| 2007/0097065 A1* | 5/2007 | Kreek | G06F 1/1637 |
| | | | 345/102 |
| 2010/0097469 A1* | 4/2010 | Blank | G02F 1/1533 |
| | | | 348/148 |

(Continued)

*Primary Examiner* — Antonio Xavier
(74) *Attorney, Agent, or Firm* — Konrad, Raynes, Davda & Victor LLP; Alan S. Raynes

(57) ABSTRACT

Provided are a computer program products, systems, and methods for directing a system to control an intensity of light emanating from a display positioned within a vehicle to display content to be viewed from outside of the vehicle. The system determines whether the system is operating in a first mode or a second mode based on at least one vehicle operating condition. A light level within the vehicle is sampled more frequently during the second mode than during the first mode. A determination is made as to whether a threshold change in the sampled light level occurs when in the second mode, and an intensity of the display is adjusted in response to the occurrence of a threshold change.

18 Claims, 7 Drawing Sheets

(56) References Cited

U.S. PATENT DOCUMENTS

| | | |
|---|---|---|
| 2011/0121957 A1 | 5/2011 | Podd et al. |
| 2012/0218282 A1* | 8/2012 | Choboter ................. G09G 5/00 |
| | | 345/589 |
| 2014/0043156 A1 | 2/2014 | Howk |
| 2014/0316900 A1* | 10/2014 | Amla ................. G06Q 30/0267 |
| | | 705/14.63 |
| 2015/0054846 A1* | 2/2015 | Okada ................... G06F 1/1684 |
| | | 345/589 |
| 2015/0279268 A1 | 10/2015 | Ganim et al. |
| 2016/0098756 A1 | 4/2016 | Ayre |
| 2017/0130508 A1* | 5/2017 | Momcilovich ......... E05F 15/71 |
| 2017/0246988 A1 | 8/2017 | Ihedinmah |
| 2018/0218611 A1* | 8/2018 | Nagura ................. B60Q 9/008 |
| 2018/0233092 A1* | 8/2018 | Du ........................... G09G 3/20 |
| 2019/0217773 A1 | 7/2019 | Sasaki et al. |
| 2020/0104880 A1 | 4/2020 | Shafai et al. |
| 2020/0107063 A1 | 4/2020 | Shafai et al. |
| 2020/0107064 A1 | 4/2020 | Shafai et al. |
| 2020/0189464 A1* | 6/2020 | Lee ..................... B60R 11/0235 |
| 2021/0103372 A1* | 4/2021 | Scheffler ............. G06F 3/04847 |

\* cited by examiner

CONTROL OF DISPLAY DIRECTING CONTENT OUTSIDE OF A VEHICLE

BACKGROUND OF THE INVENTION

1. Field of the Invention

The present invention relates to the configuration of a display directing content outside of a vehicle and its control, including computer program products, systems, and methods.

2. Description of the Related Art

Vehicle mobile digital signage involves mounting a display screen in or on a car, and displaying content such as, for example, safety information or advertisements, while the car is driving around. Screens mounted on a roof racks, as well as displays mounted inside vehicles, have been utilized.

DETAILED DESCRIPTION

Figure 1A:
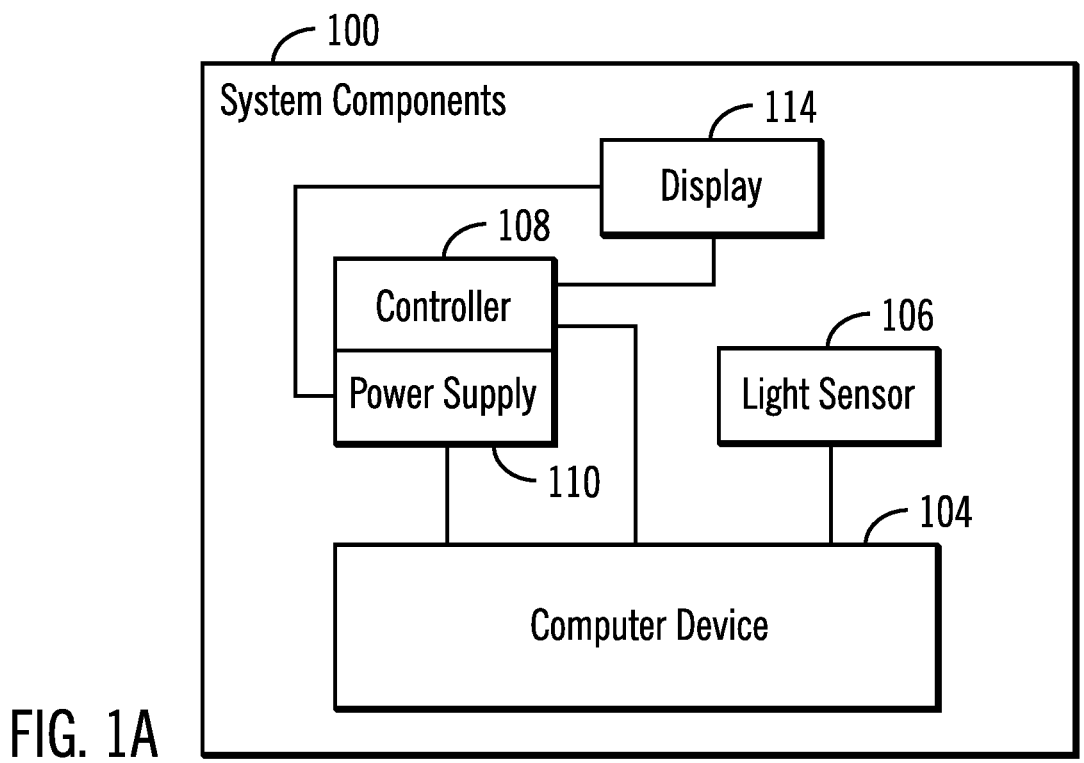
FIG. 1A illustrated a schematic of components in a system used for controlling the brightness of a display, in accordance with certain embodiments.

Current mobile signage often involves providing either an outside of vehicle display system or an in-vehicle display system directing its content outwards from the vehicle. In certain systems, problems such as lighting emanating from the display may reach the driver and interfere with the driver's vision. Certain embodiments of the present invention provide for control of lighting to the display which strives to provide an optimized intensity of light emanating from the display. One object of certain embodiments is to provide maximized brightness during daylight hours and to minimize brightness during nighttime hours. Another object of certain embodiments includes minimizing backlighting in the interior of the vehicle at nighttime.

Certain embodiments provide improved computer technology and system design to control an intensity of light emanating from a display positioned within a vehicle to display content to be viewed from outside of the vehicle. Embodiments may include a system that maintains operating parameters for operating in a first mode and in a second mode and determines the mode the system is operating in. A light level within the vehicle may be sampled more frequently during the second mode than during the first mode, and a determination is made whether there has been a threshold change in the sampled light level during the second mode. If a threshold change has occurred then the intensity of the display may be adjusted to compensate for the change in sampled light. In certain embodiments the first mode corresponds to a daytime period and the second mode corresponds to a nighttime period.

In one aspect of certain embodiments, determining whether the system is in the first mode or the second mode is at least partially based on at least one vehicle operating condition. In another aspect of certain embodiments, the determining whether the system is in the first mode or the second mode comprises reading a clock time from the system and sampling a light level within the vehicle.

In another aspect of certain embodiments, the determining whether the system is in the first mode or second mode may include deciding that the system is in the first mode when the read clock time is within a first clock time range and the sampled light level within the vehicle is within a first brightness range, and deciding that the system is in the second mode when the read clock time is within a second clock time range and the sampled light level within the vehicle is within a second brightness range, wherein the first brightness range has a higher brightness level than the second brightness range.

An additional aspect of certain embodiments includes holding the display at a constant intensity when the system is in the first mode, and sampling the light level within the vehicle a plurality of times when in the second mode, wherein the determining whether there is the threshold change and adjusting the intensity is performed each time the light level is sampled. In certain embodiments, a threshold change may result from a reduction in the sampled light level or an increase in the sampled light level, where in response to the threshold change resulting from a reduction in the sampled light level the intensity of the display is increased, and where in response to the threshold change resulting from an increase in the sampled light level the intensity of the display is decreased.

Certain embodiments include components such as a display configured to be mounted in a vehicle; a light sensor configured to be mounted in the vehicle and configured to sense a light level in a localized area of the vehicle; and a processor configured to send a signal to the display to control an intensity of light emanating from the display. In certain embodiments the light sensor is separate from the display and configured to detect light emanating from the display and being reflected off of one or more surfaces in the vehicle, such as the rear window, and directed towards a driver in the vehicle.

Figure 1B:
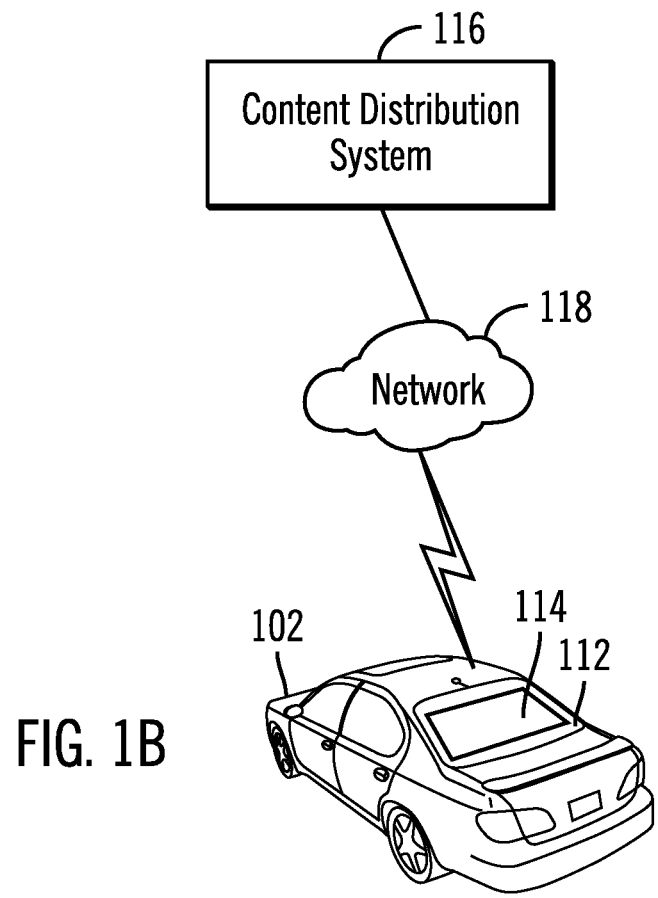
FIG. 1B illustrates a content distribution environment in accordance with certain embodiments.

FIG. 1A illustrates an embodiment of a system 100 including components that may be positioned in a vehicle 102 as illustrated in FIG. 1B. The vehicle 102 may comprise any type of vehicle including, but not limited to, a personal vehicle, commercial vehicle, truck, bus, car, autonomously driven car, etc. The system 100 components may include a computer device 104 in communication with a light detector 106, a video controller 108, and a power supply 110. The system may also include a display 114 in communication with the video controller 108 and the power supply 110.

As illustrated in FIG. 1B, the vehicle 102 may include the display 114 coupled to an interior portion of the rear window 112, so that content may be displayed to those outside of the vehicle 102. The computing device 104 may in certain embodiments include a Global Positioning System (GPS) or the like to determine a location of the vehicle 102 and a wireless transceiver to allow wireless communication with devices, such as BLUETOOTH®, wireless local area networking, e.g., WI-FI™, etc. The computer device 104 may comprise one or more of a smartphone, a RASPBERRY PI®, or other dedicated communication and processing device. The computer device 104 may also include one or more modules such as a BerryGPS-IMUv3 for the Raspberry Pi, by Ozzmaker, available through AMAZON, which includes GPS, accelerometer, gyroscope, magnetometer (compass), barometric/altitude, and temperature devices or sensors. Such features may be used for a variety of purposes, including, for example, tracking and directions, and monitoring the temperature of the system to protect it by powering down if it gets too hot. (Bluetooth is a registered trademark of the Bluetooth Special Interest Group, WIFI is a trademark of the Wi-Fi Alliance, Raspberry Pi is a registered trademark of the Raspberry Pi Foundation, AMAZON is a registered trademark of the Amazon.com, Inc.). The computer device 104 may be housed for protection in an enclosure such as, for example, a polymeric box.

The display 114 may comprise any suitable display for transmitting light outside of a vehicle for viewing by others outside of the vehicle. Certain embodiments utilize LED's mounted to a flexible panel that is then affixed to the rear window. The display 114 may be configured to be substantially transparent from the driver's side so that the driver can see through the rear window with minimal interference from the display. For example, a display may include a plurality of rows of LED's (light-emitting diodes) that are spaced far enough apart so that the driver's view through the rear window is not impaired. One embodiment includes an LED panel having the following specifications: (1) pixel pitch of 5.2 mm by 2.6 mm; (2) pixel density of 73,728 pixels/square meter; (3) pixel configuration of 1R1G1B (R=red, G=green, B=blue); module resolution of 12 by 96 pixels; panel resolution of 144 by 96 pixels; and a display size of 750 mm by 250 mm.

The display 114 may comprise a thin film or flexible display, such as a rollable display, a projection screen, etc. In certain embodiments, the display 114 may have an adhesive on one side to adhere to the inside of the rear window 112 or may adhere by static cling or be otherwise mounted or positioned on or close to the rear window. Examples of display types that may also be suitable include, but are not limited to, Liquid Crystal Displays (LCDs) and transparent organic light-emitting diode (OLED) displays.

The controller 108 may act to take a high definition output HDMI signal from the computing device 104 (processor) and convert it into a video signal that can be used by the display 114. For example, the controller 108 may taking a 1920 by 1080 pixel image from the computing device 104 and convert it into a 144 by 96 pixel image for the display 114. The power supply 110 that may be coupled to the vehicle power system may be used to regulate power to components including the computing device 104 and the display 114. Certain embodiments may utilize a component that serves as both controller 108 and power supply 110.

Any suitable light sensor may be used in various embodiments. One example of a suitable light sensor is HiLetgo model no. GY-30 BH1750FVI Digital Light Intensity Sensor Module, manufactured by HILETGO, available through AMAZON. HILETGO and AMAZON are both registered trademarks. The light sensor may in certain embodiments be positioned within an enclosure such as a polymeric box with an opening to permit light to enter. A clear cover may be placed over the opening to protect the enclosure from dirt and the like. Such a polymeric box may in certain embodiments be a smaller enclosure separate from that utilized for housing the computer device 104. Housing the components separately enables the light sensor to be positioned in a variety of locations within the vehicle that can maximize its effectiveness. For example, the computing device 104 may be placed, for example, in a location on or near the vehicle 102 floor or under a seat. Such a location for the light sensor 106, were it positioned with the computing device, could result in the sensor 106 being unable to effectively sense light in the vehicle 102.

As illustrated in FIG. 1B, in certain embodiments, content may be supplied to the vehicle 102 through a content distribution system 116 and supplied to the system 102 in vehicle 102 through a network 118. Alternatively, the content may be self-contained within the system 100 in the vehicle 102 or otherwise supplied using any suitable manner. The operator of the content distribution system 116 may provide drivers, such as ride-sharing drivers, the system 100 including display 114 to position in their car. In embodiments where the computer device 104 includes and/or interacts with a smartphone, a driver may then download a content rendering program to their smartphone to use to stream content through to computer device 104 and to the display 114 to then project outward from the vehicle.

Figure 2:
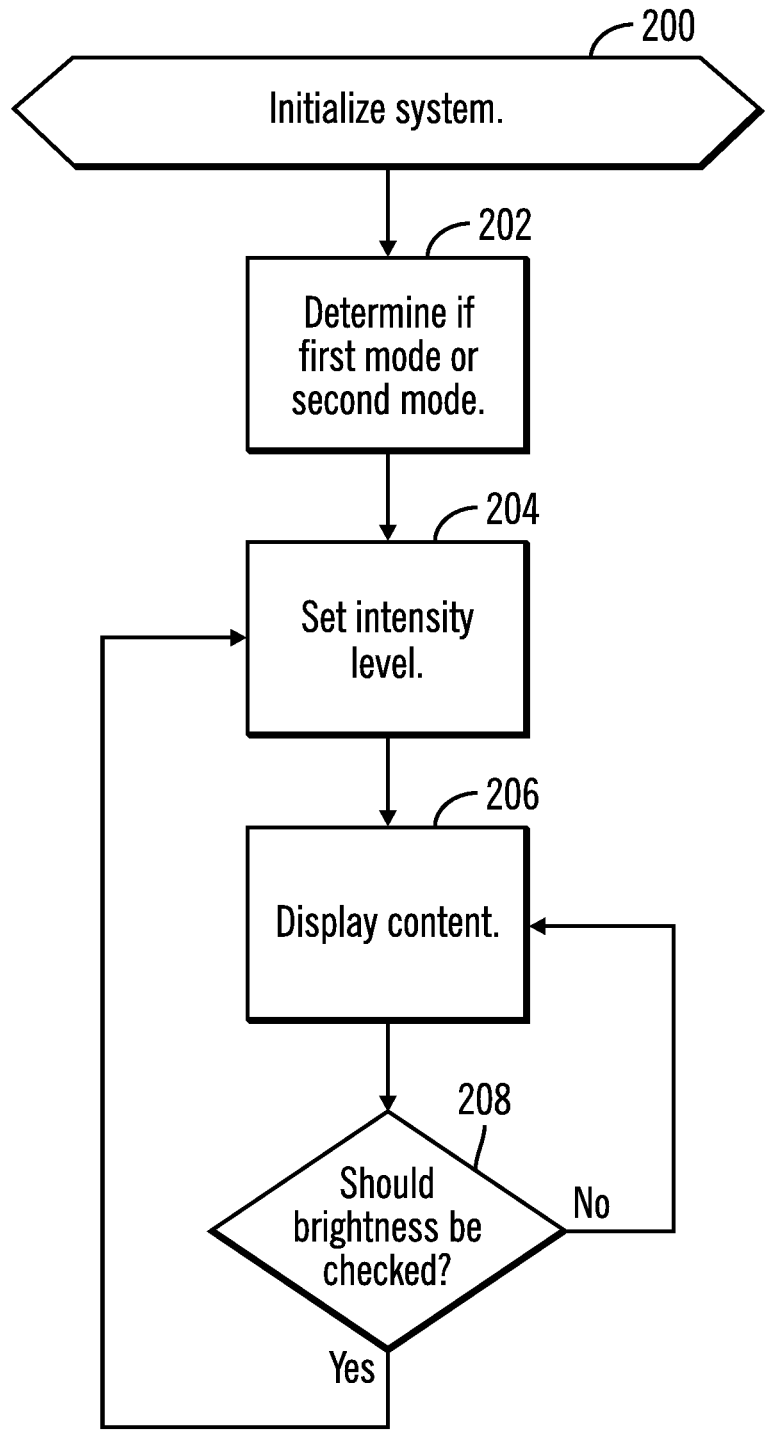
FIG. 2 illustrates operations for controlling brightness of a display in accordance with certain embodiments.

FIG. 2 illustrates operations performed by the computer device 104 for controlling an intensity of the display 106 in accordance with certain embodiments. After initialization (at block 200), depending on certain vehicle conditions, the computer device 104 may be set to operate in a first mode or a second mode (at block 202), with, for example, the first mode corresponding to daytime and the second mode corresponding to nighttime. Vehicle operating conditions may include a variety of conditions, including, but not limited to, light inside the vehicle and time of day. A desired intensity level is set (at box 204) based on at least one of the time of day and the brightness detected by light detector 106. Content is then shown (at block 206) on the display 114. In certain embodiments, the content may be in the form of a slideshow of images. In certain embodiments the slideshow may provide 8 different slides that run for 8 seconds each. The group of slides may be run for any desired number of loops. The system decides if the brightness should be checked (at box 208). In response to a desired amount of content being played (for example, a desired number of slides, or a desired number of loops of slides, or a desired amount of elapsed time), the system will check the brightness. The computer device 104 may then set the intensity level for the display 114 again (at box 204 and modify the intensity level when needed or desired, to achieve a balance of viewability while minimizing interference with the driver's vision. The computer device 104 will continue to display content (at box 206) until the conditions are such that the brightness should be checked again (at box 208).

The intensity level of the display 114 may be controlled using a variety of suitable methods. One method includes controlling the luminance of an LED display to balance optimization during the day for brightest luminance and in the evening for least ambient impact on the driver's vision. Illumination in the interior of the vehicle 102 may be measured by positioning the light sensor 106 in a position at or near to the driver 120 (see FIG. 7) and oriented facing towards the display 114.

Figure 7:
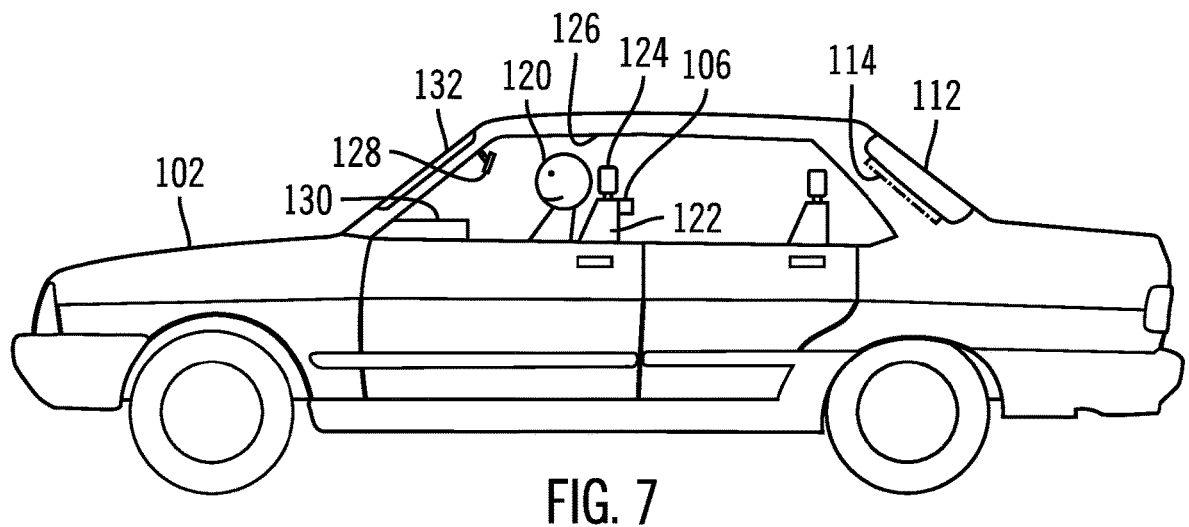
FIG. 7 illustrates possible locations of certain features in a vehicle, including light sensor and display, in accordance with certain embodiments.

As seen in FIG. 7, the vehicle 102 may include the display 114 positioned adjacent to the rear window 112. The light sensor 106 in this embodiment may be positioned adjacent to the front seat 122 and oriented to receive light reflected off of surfaces in the vehicle 102 such as the interior of the rear window 112. As illustrated in FIG. 7, the light sensor 106 is coupled to the back of the front seat 122 behind the driver 120. Other suitable locations for coupling the light sensor 106, include, but are not limited to, other locations on the seat 122 such as on the headrest 124, the interior roof region 126, a passenger side of the seat 122 or on a passenger seat (if bucket seats), or on near the rear view mirror 128, or on a portion of the dashboard 130 or on an interior portion of the windshield 132. The goal is to be able to sense a similar amount of light as the driver senses, so that intensity adjustments to minimize driver distraction can be made. Various embodiments may include the light sensor 106 being positioned within about 3 feet, 2 feet, or 1 foot of the top of the driver's seat. Other distances are also possible, though the light reading when compared with the light reaching the driver's eyes may not as accurately reflect the light reaching the driver's eyes as the distance increases.

When the display 114 is an LED display, controlling the luminosity may be carried out by controlling the on versus off state of the individually addressable LEDs that make up the display 114. Each LED in the display 114 may work as a pixel of addressable color varying from black to white (0,0,0 to 255,255,255). All white LEDs will have all emitters in the LED package on at some relative intensity. In comparison, a black LED will have all the LED emitters turned off and be characterized as an absence of light.

By creating an opacity overlay of pixels varying between 0 and 255 the overlay will cover all pixels in the content (for example, a slide in a slide show) and vary between a solid black layer and a completely transparent layer, with 254 levels of intensity in between. This will allow a slide show process of the display 214 to control the intensity of light. In certain embodiments, during the day the opacity layer is made transparent and the LED display achieves full intensity, and at night the opacity layer is made a percentage black and the intensity of dramatically reduced. In certain embodiments, when in night mode, the light sensor 206 is sampled after every slide or individual content segment is played, so see if the intensity needs to be modified.

FIGS. 3-6 illustrate operations performed by the system components 100, including the computer device 104 and light detector 106, in accordance with certain embodiments for controlling the intensity of the display 114 under a variety of conditions and determining a mode of operation. The system may operate in day mode or in night mode. An example of day mode operations is set forth in FIG. 4. An example of night mode operations is set forth in FIG. 5. An example of operations when the initial startup indicates that it is unknown whether the conditions correspond to day mode or night mode is set forth in FIG. 6.

Figure 3:
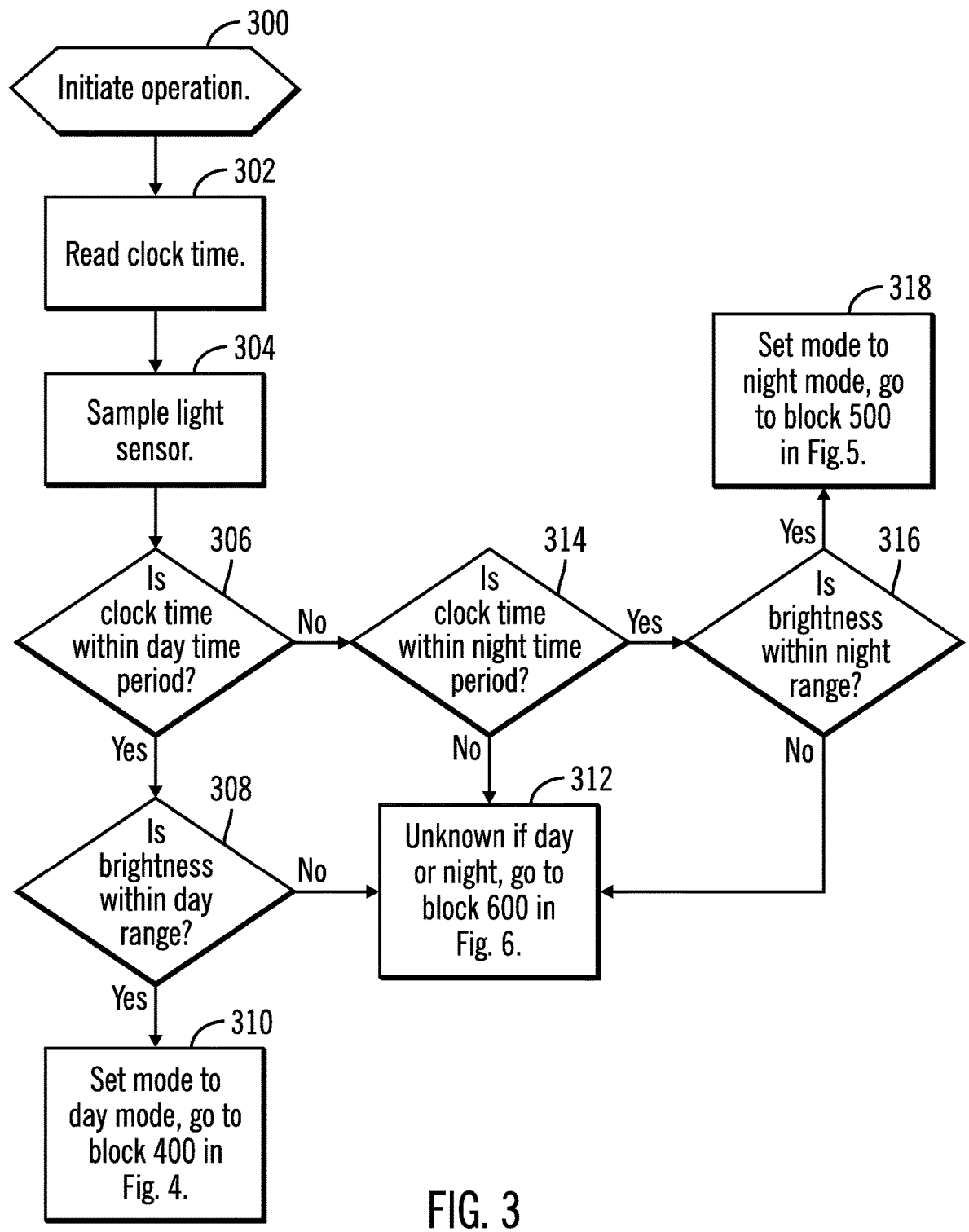
FIG. 3 illustrates operations for determining a control mode for controlling a display in accordance with certain embodiments.

FIG. 3 illustrates an embodiment of operations performed by the computer device 104 to make initial determination regarding the system mode when the system is started (at block 300). A clock time is read (at block 302), from a clock in the computer device 104 or external clock, and the light sensor 106 is sampled (at block 304). The computer device 104 checks to determine if the conditions are such day mode is set in the computer device 104. The clock time is reviewed to determine if it falls within a daytime period (at block 306), which generally corresponds to the time after daybreak when there is light in the sky. The daytime period may be pre-programmed in the computer device 104, may be downloaded or obtained from another source, and may be modified for a variety of reasons such as, for example, as the daylight grows longer or shorter as the seasons progress, or when daylight savings time is in force. An example of a daytime period is between 7 am and 7 pm.

If the clock time is within the daytime period (at block 306), then the sampled brightness from the light sensor 106 is checked (at block 308) to determine if it falls within a day brightness range. An example of a daytime brightness range is a brightness of greater than 150 lux. If the clock time is within the daytime period (at block 306) and the sampled brightness is within the daytime brightness range (at block 308), then the computer device 104 is set (at block 310) to operate in day mode. If the clock time is within the daytime period (at block 306) and the sampled brightness is not within the daytime brightness range (at box 308), then it is unknown (at block 312) if the mode should set to day mode or night mode.

If the clock time is not within the daytime period (at block 306), then the computer device 104 checks (at block 314) whether the clock time is within the nighttime period. Similar to the daytime period, the nighttime period may be pre-programmed in the computer device 104, may be downloaded or obtained from another source, and may be modified for a variety of reasons such as those noted above. An example of a nighttime period is between 7 pm and 7 am. If the clock time is not within the daytime period (at block 306), and the clock time is within the nighttime period (at block 314), then the computer device 104 determines (at block 216) if the sampled brightness level is within the nighttime brightness range. If the sampled brightness is within the nighttime range (at block 316), then the computer device 104 (at block 318) is set to operate in night mode. If the sampled brightness is not within the nighttime range (at block 316), then it is unknown (at block 312) if the mode should be day mode or night mode.

Similarly, if the clock time is not within the daytime period, and the clock time is not within the nighttime period, then again it is unknown (at block 312) if the mode should be day mode or night mode.

Figure 4:
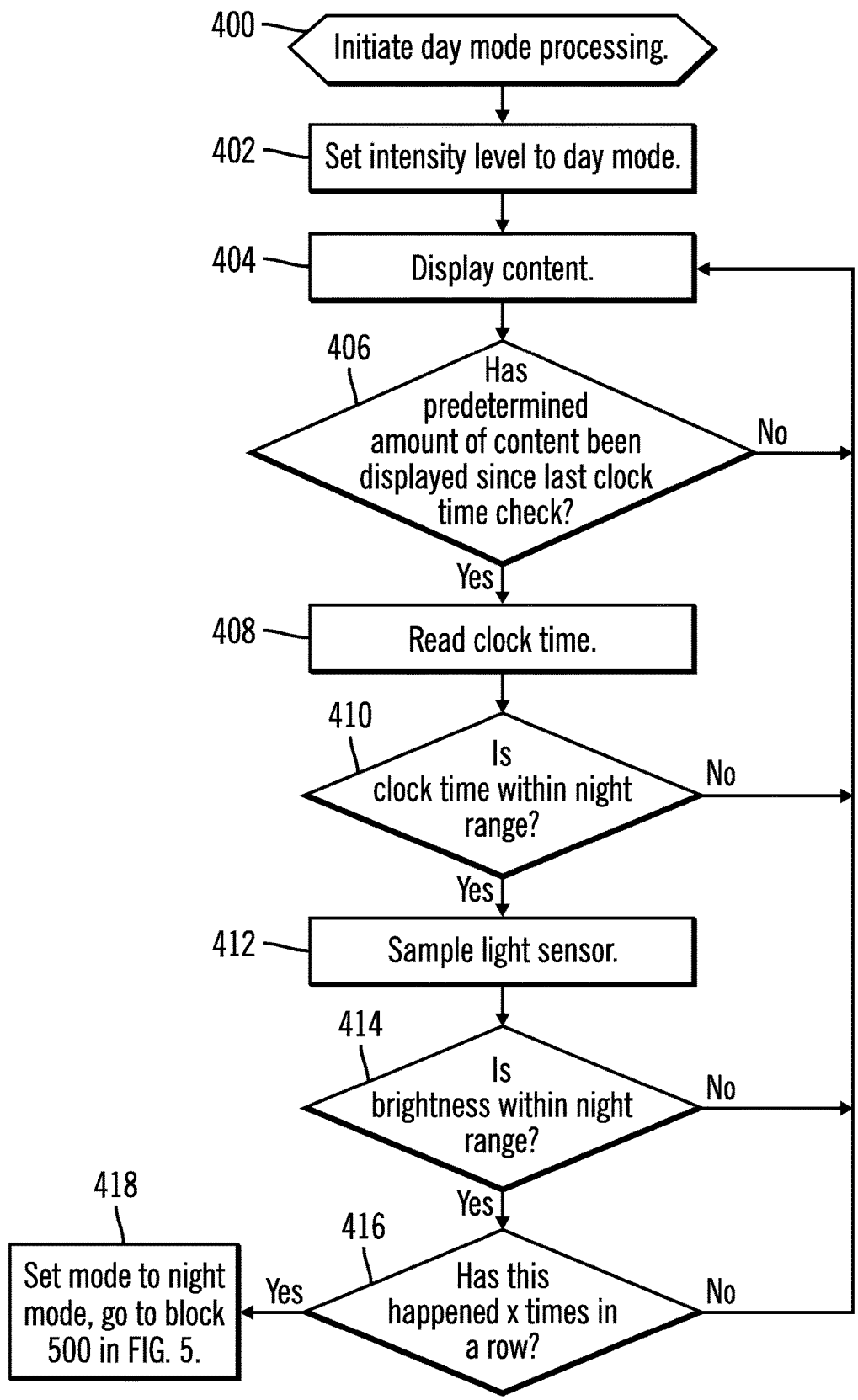
FIG. 4 illustrates operations for controlling a display when in a day mode in accordance with certain embodiments.

FIG. 4 illustrates operations performed by the computer device 104 when operating in in day mode (at block 400), in accordance with certain embodiments. When in day mode, the computer device 104 sets (at block 402) a desired intensity level for the display and starts displaying the desired content (at block 404). Any suitable intensity level may be utilized. In certain embodiments the intensity is set to the maximum intensity for the display. This means that in certain embodiments the amount of transparency will be 100 percent so that the maximum intensity of the display will be transmitted. During daylight hours, usage of the maximum intensity will ensure that the content displayed is easily visible from outside of the vehicle.

The computer device 104 determines (at block 406) whether a predetermined amount of content has been displayed. For example, if the content is displayed as a slideshow, then the computer device 104 may check whether the system has shown a certain number of slides. If not, then the computer device 104 continues to play slides (back to block 404) until the predetermined number of slides have been played. Once the predetermined amount of content has been displayed (at block 406), the clock time is read (at block 408) and the computer device 104 determines (at block 410) whether the clock time is within the nighttime range. If not, then the computer device 104 continues to display content (back to block 404) until the next clock check interval occurs (at block 406). In certain embodiments consistent with FIG. 4, the intensity of the display is not varied when the computer device 104 is operating in day mode. Reasons for this may include, but are not limited to, desiring to ensure that the display is bright enough to be viewed from outside the vehicle easily, for simplification of operating steps, and because there is generally a high amount of ambient light during the daylight hours the driver is unlikely to be distracted by light from the display and thus there is no need to lower the intensity to protect the driver's eyes. Other embodiments could vary the intensity during the day if desired.

When the clock time is read (at block 410) and has transitioned to being within the night period (for example, after 7 pm), then the light sensor 106 is sampled (at block 412) and the computer device 104 determines (at block 414) if the sampled brightness is within the night brightness range (for example, less than 150 lux) If the light level is not within the night brightness range, then the system will continue to display content (back to block 404) in day mode at the previously set intensity level. If the brightness (at block 414) is within the night range, then the computer device 104 determines (at block 416) whether this condition (clock time within night range and brightness within night range) has occurred a desired number x of times in a row. If it has not occurred the desired number x times in a row, then the system continues to display content while in day mode (back to block 404) until the clock time is within the night period and the sampled brightness is within the night range for the desired x number of cycles. The desired number x of cycles may be one or greater, with certain embodiments including x equal to 4. This means that the computer device 104 will not change the operating mode from day mode to night mode unless a predetermined amount of content has been displayed, the clock time is within the night range, and the brightness is within the night range for 4 consecutive cycles. When the desired number of cycles have occurred, the computer device 104 will (at block 418) set the mode to night mode and night mode operations will proceed.

Figure 5:
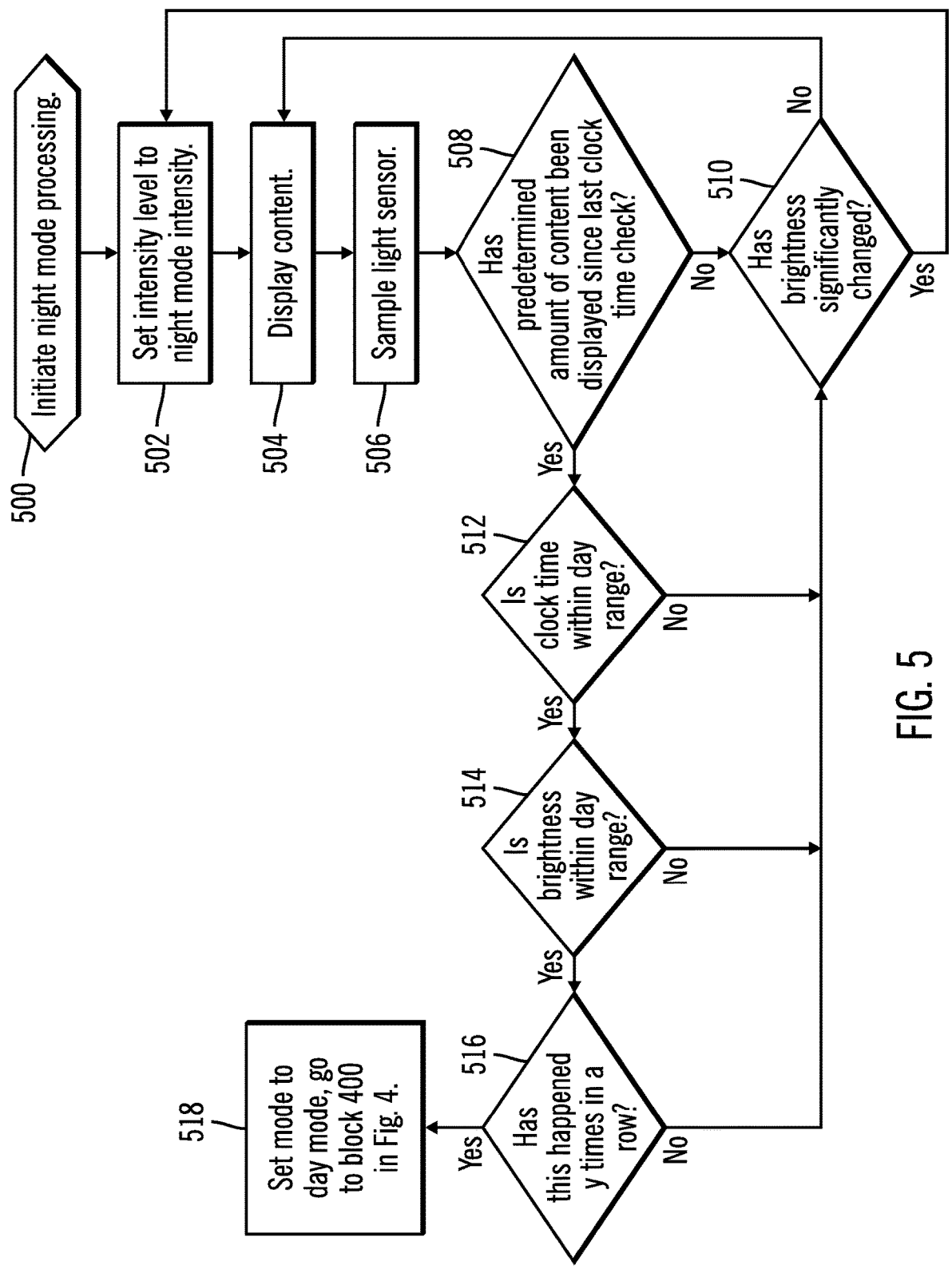
FIG. 5 illustrates operations for controlling a display when in a night mode in accordance with certain embodiments.

FIG. 5 illustrates operations performed by the computer device 104 when operating in night mode (at block 500), in accordance with certain embodiments. When in night mode, the computer device 104 sets (at block 502) a desired intensity level for the display and starts displaying the desired content (at block 504). Any suitable intensity level may be utilized. In certain embodiments the intensity is set to a relatively low level for the display, which will suffice for the content displayed to be visible from outside of the vehicle, and which minimizes light from the display adversely affecting the driver. This means that the display will have a substantially lower intensity during night mode than during day mode, when the transparency layer may be set, for example, at a constant level of 100% transparency (0% opaque), resulting in maximum intensity. During the daytime hours, the ambient light level is high enough so that the light from the display will not interfere with the driver's ability to see through the display or cause reflections that interfere with the driver's vision.

In certain embodiments, when in night mode, the level of transparency or opacity (and thus the intensity of the display) is controlled to be in a range of from 15/255 (approx. 6% transparent or 94% opaque) to 35/255 (approx. 14% transparent or 86% opaque), depending on the light measured by the light sensor. Other ranges are also possible.

The computer device 104 samples the light sensor (at box 506) and determines (at block 508) if a predetermined amount of content has been displayed. If the predetermined amount of content check whether a predetermined amount of content has been displayed since the last time the clock time was checked. For example, if the content is displayed as a slideshow, then the computer device 104 may check whether the system has shown a certain number of slides since the clock was last checked. If the certain number of slides have not been shown, the computer device 104 (at block 508) determines whether the brightness from the sampled light sensor has changed a sufficient amount (above a threshold) to justify modifying the intensity level of the display. Thus, if the brightness has changed enough so that a visually significant change in the display intensity is merited, then the computer device 104 will reset the intensity level (at block 502) using the just sampled brightness to set the intensity level of the display. In certain embodiments a threshold value for brightness change is 6 lux. This means that if the change in sampled light brightness is less than 6 lux, then the system will not modify the intensity. This saves computer device 104 and other component resources due to the decrease in processing operations. In such embodiment, if the change in brightness is 6 lux or greater, then the intensity will be modified.

The determination of where within the 15/255 to 35/255 range to set the transparency may be carried out as follows: First, a check is made to determine if the change in brightness between the current sensor reading and the previous sensor reading exceed a threshold amount of brightness. Certain embodiments use a threshold of 6 lux, so that if the change in the sampled brightness from one reading to the next is 6 lux or greater, then the transparency value may be changed.

An average twilight luminance value may be about 100 lux, which may represent a target light level at which ambient light from the display reflected back into the vehicle can be picked up as additional illumination at the light sensor. The amount to change the transparency value when the night mode brightness readings vary may in certain embodiments be determined by first calculating a transparency value (TV) as a percent of 255 using the following equation (1):

$$TV=(-2.55\times(\text{light measurement in } lux)+255)/255 \qquad (1)$$

For example, a light sampling of 100 lux yields a transparency number of 0. A transparency number (TN) may then be determined using the following equation (2):

$$TN=(TV\times(TN\max-TN\min))+TN\min \qquad (2)$$

In equation (2) TNmax equals a night maximum transparency number, and TNmin equals a night minimum transparency number. In certain embodiments TNmax is 35 and TNmin is 15. Using the light sampling example of 100 lux, the resultant TN equals 15, which is the TNmin in this embodiment. If the next brightness sampling yields a 50 lux reading, then the resultant TV equals 0.5 and the TN equals 25. In such a case, the transparency number changes from 15 to 25, which increases the intensity of the display. This means that the amount of transparency would increase from an 15/255 value (only about 6% transparent) to a 25/255 value (about 10% transparent). As the sampled brightness decreases towards 0 lux, the TV will increase towards 1 and resultant TN will increase towards the TNmax of 35, or a transparency value of 35/225 (about 14% transparent). Thus, as the sampled brightness decreases towards 0 lux, the intensity of the display will be increased till it reaches the night maximum setting.

If the predetermined amount of content has not been displayed and the brightness has not significantly changed, then the system will continue to display content (at block 504).

If the predetermined amount of content has been displayed (at block 508), the system reads the clock time and determines if it is within the day range. If the clock time is determined (at block 512) to not be within the day range, then the system checks (at block 510) whether the sampled brightness has significantly changed.

If the predetermined amount of content has been displayed (at block 508) and the clock time is within the day range (at block 512), then the system (at block 514) determines whether the brightness is within the day range. If the brightness is determined not to be within the day range (at block 514), then the computer device 104 checks (at block 510) whether the sampled brightness has significantly changed.

If the predetermined amount of content has been displayed (at block 508) and the clock time is within the day range (at block 512), and the brightness is within the day range (at block 514), then the computer device 104 determines (at block 516) whether this condition (predetermined amount of content has been displayed, clock time within day range, brightness within day range) has occurred a desired number y of times in a row. If it has not occurred the desired number y times in a row, then the system continues to display content while in night mode (back to block 510) and goes through the various operations until the conditions have occurred y times in a row (at block 516). When this occurs, the mode is changed (at block 518) from night mode to day mode, and day mode operations will then proceed. The desired number y of cycles may be one or greater, with certain embodiments including x equal to 5. This means that the computer device 104 will not change operating mode from night mode to night mode unless a predetermined amount of content has been displayed, the clock time is within the day range, and the brightness is within the day range for 5 consecutive cycles.

Figure 6:
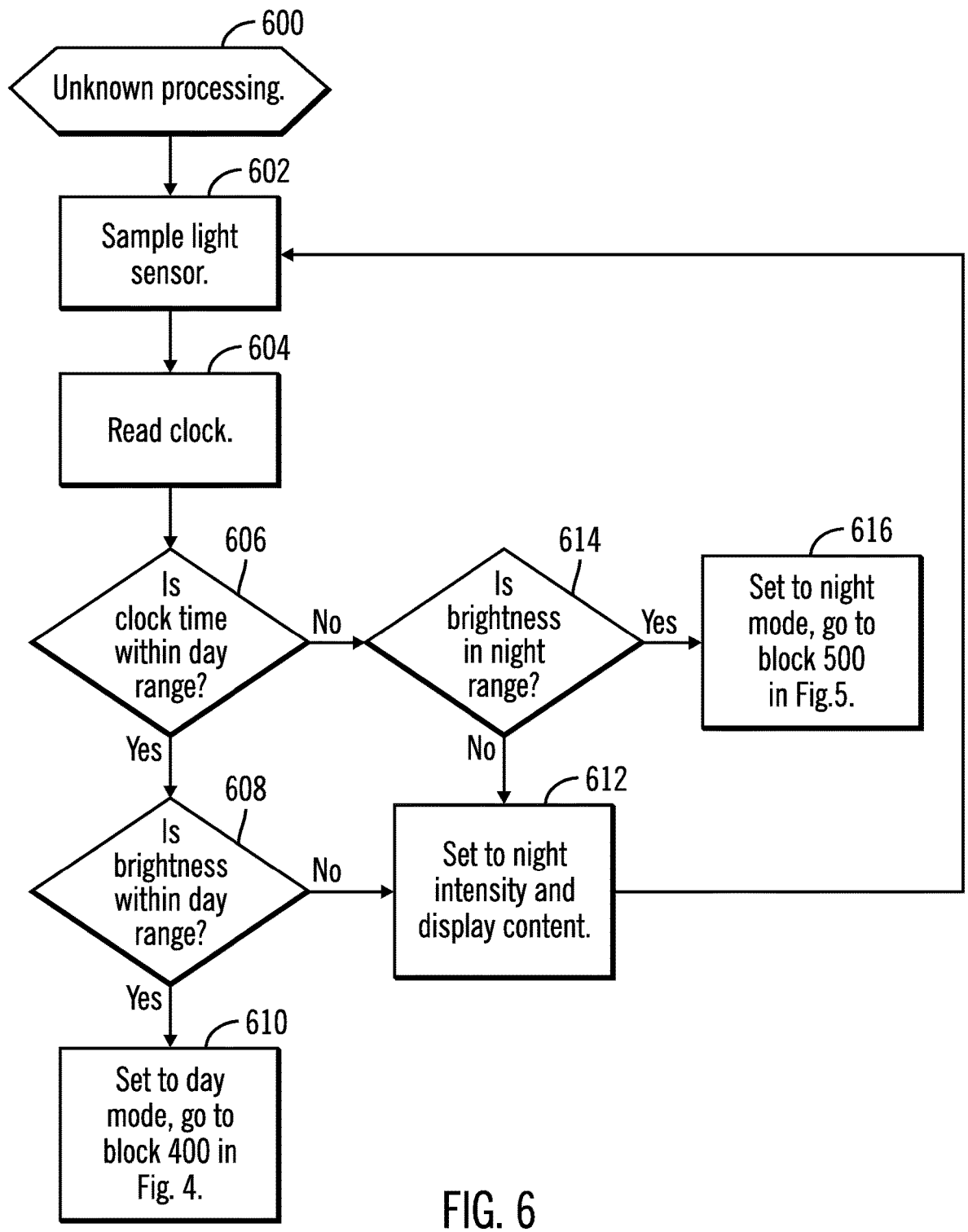
FIG. 6 illustrates operations in accordance with certain embodiments.

FIG. 6 illustrates operations performed by the computer device 104 when it is unknown (at block 600) whether the conditions should set the computer device 104 to operate in day mode or night mode. The computer device 104 samples the light sensor 106 (at block 602) and reads the clock (at block 604). The computer device 104 determines (at block 606) if the clock time is within the day range. If the clock time is within the day range (at block 606), then the computer device 104 determines (at block 608) if the sampled brightness is within the day brightness range. If the clock time is within the day range (at block 606) and the sampled brightness is in the day brightness range (at block 608), then the computer device 104 operates in day mode (at block 610) and day mode operations can then proceed (at block 400 in FIG. 4).

If the clock time is not within the day range then the computer device 104 determines (at block 614) if the brightness is in the night brightness range. If the clock time is not in the day range (at block 606) and the brightness is in the night range (at block 614), then the computer device 104 is set (at block 616) to night mode and night mode operations (at block 500 in FIG. 5) can then proceed.

If the clock time is within the day range (at block 606) and the brightness is not within the day brightness range (at block 608) then the intensity is set to a night value (at block 612) and content is displayed. The computer device 104 then samples the light sensor 106 again (at block 602) and cycles through the operations until the conditions are satisfied that set the computer device 104 to operate in day mode or night mode. In certain embodiments the conditions for setting to day mode or night mode only need to be met one time and the condition will be set. This is so that the computer device 104 will choose whether to go into day mode or night mode as quickly as possible when it is initially unknown if the mode should be day mode or night mode.

The content displayed by the computer device 104 as described in various embodiments may be executed by a processor running a program in the computer device 104. Alternatively, some or all of the program may be implemented in separate hardware devices, such as Application Specific Integrated Circuit (ASIC) hardware devices.

The functions described as performed by any programs running in the system may be implemented as program code in any suitable region of the computing device 104 or other devices in the system or external to the system (such as through a network) and configured to provide information to the system. Such networks may comprise a cellular network, the Internet, etc.

The computer device 104 may store program components and corresponding data, for example, in a non-volatile storage or memory incorporated into the computer device 104 or elsewhere in the system 100. Generally, programs and program components may comprise routines, programs, objects, components, logic, data structures, and so on that perform particular tasks or implement particular abstract data types. The program components and hardware devices of the system 100 may be implemented in one or more computer systems, where if they are implemented in multiple computer systems, then the computer systems may communicate over a network.

The present invention may be a system, a method, and/or a computer program product. The computer program product may include a computer readable storage medium (or media) having computer readable program instructions thereon for causing a processor to carry out aspects of the present invention.

The computer program product comprises a computer readable storage medium implemented using standard programming and/or engineering techniques to produce software, firmware, hardware, or any combination thereof. The described operations may be implemented as code or logic maintained in a "computer readable storage medium". The term "code" and "program code" as used herein refers to software program code, hardware logic, firmware, microcode, etc. The computer readable storage medium, as that term is used herein, includes a tangible, physical element, including at least one of electronic circuitry, storage materials, a casing, a housing, a coating, hardware, and other suitable materials. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. A computer readable storage medium is not comprised solely of transmission signals and includes physical hardware and tangible components. Those skilled in the art will recognize that many modifications may be made to this configuration without departing from the scope of the present invention, and that the article of manufacture may comprise suitable information bearing medium known in the art.

Aspects of the present invention are described herein with reference to flowchart illustrations and/or block diagrams of methods, apparatus (systems), and computer program products according to embodiments of the invention. It will be understood that various elements in the figures, including, but not limited to, blocks in the flowcharts, may be omitted, reordered, or otherwise modified in accordance with certain embodiments. It will also be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
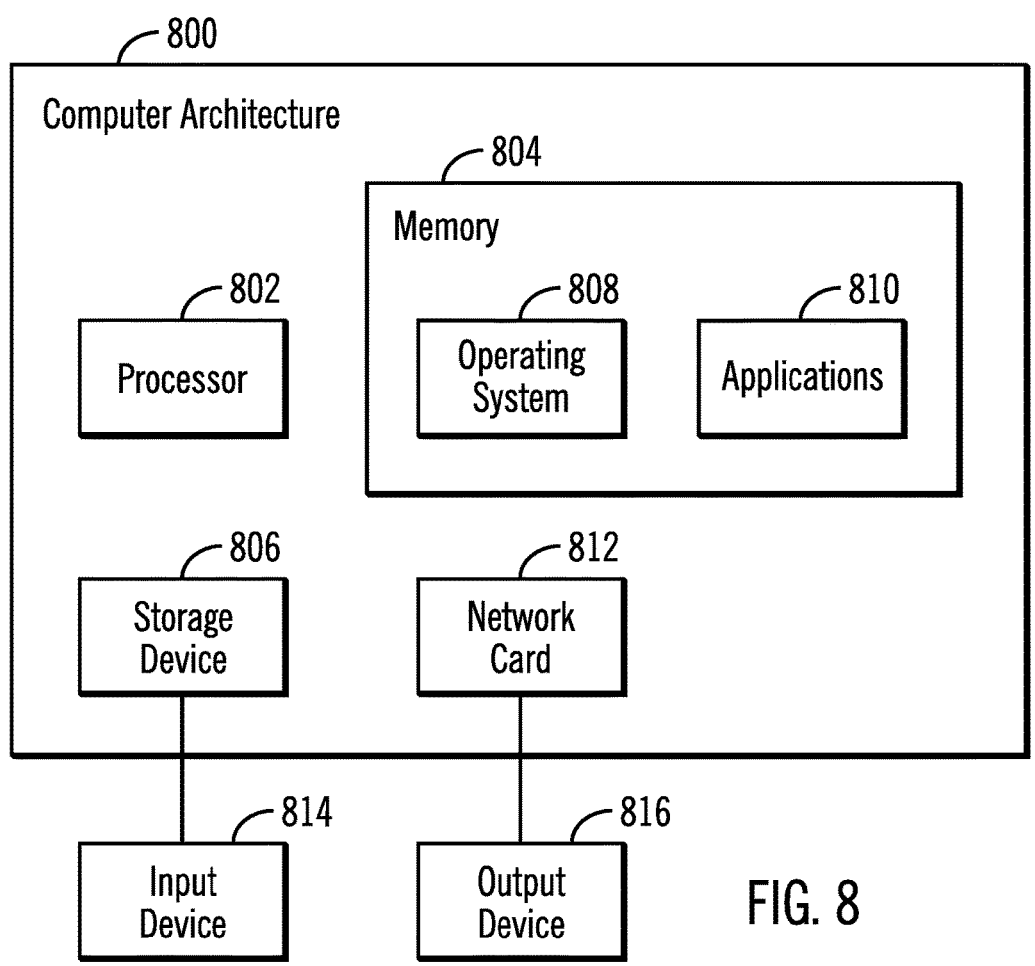
FIG. 8 illustrates a computing environment in which components of FIG. 1A may be implemented

The computational components of FIG. 1A, including the computer device 104, may be implemented in one or more computer systems, having a computer architecture, for example, as shown in FIG. 8, and including a processor 802 (e.g., one or more microprocessors and cores), a memory 804 (e.g., a volatile memory device), and storage 806 (e.g., a non-volatile storage, such as magnetic disk drives, solid state devices (SSDs), optical disk drives, a tape drive, etc.). The storage 806 may comprise an internal storage device or an attached or network accessible storage. Programs, including an operating system 808 and applications 810 stored in the storage 806 are loaded into the memory 804 and executed by the processor 802. The architecture 800 may further include a network card 812 to enable communication with a network, which may comprise a wireless network, e.g., cellular, WI-FI™, BLUETOOTH® or a wired network. An input device 814 may be used to provide user input to the processor 802, and may include a keyboard, mouse, pen-stylus, microphone, touch sensitive display screen, or any other activation or input mechanism known in the art. An output device 816, such as a display monitor, printer, storage, etc., is capable of rendering information transmitted from a graphics card or other component. The output device 816 may render the GUIs described with respect to figures and the input device 814 may be used to interact with the graphical controls and elements in the GUIs described above. The architecture 800 may be implemented in any number of computing devices, such as a server, mainframe, desktop computer, laptop computer, hand held computer, tablet computer, personal digital assistant (PDA), telephony device, cell phone, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for controlling an intensity of light emanating from a display positioned within a vehicle to display content to be viewed from outside of the vehicle, the computer program product comprising a computer readable storage medium having computer readable program code embodied therein that when executed performs operations, the operations comprising:
   determining a first mode or a second mode based on a sampling of a light level within the vehicle;
   after the determining one of the first mode and the second mode, further sampling a light level within the vehicle more frequently during the second mode than during the first mode;
   determining whether a threshold change in the further sampled light level occurs when in the second mode; and
   adjusting an intensity of the display in response to occurrence of the threshold change.

2. The computer program product of claim 1, wherein the determining the first mode or the second mode further comprises reading a clock time.

3. The computer program product of claim 2, wherein the determining the first mode or second mode further comprises:
   determining the first mode when the read clock time is within a first clock time range and the sampled light level within the vehicle is within a first brightness range; and
   determining the second mode when the read clock time is within a second clock time range and the sampled light level within the vehicle is within a second brightness range, wherein the first brightness range has a higher brightness level than the second brightness range.

4. The computer program product of claim 3, wherein the first clock time range indicates daytime hours and wherein the second clock time range indicates nighttime hours.

5. The computer program product of claim 1, wherein the operations further comprise:
   holding the display at a constant intensity when in the first mode, wherein the further sampling the light level samples
   the light level within the vehicle a plurality of times when in the second mode, wherein the determining whether there is the threshold change and adjusting the intensity is performed each time the light level is sampled.

6. The computer program product of claim 1, wherein the operations further comprise:
   detecting that the threshold change results from a reduction in the sampled light level or an increase in the sampled light level;
   increasing the intensity of the display in response to occurrence of the threshold change resulting from a reduction in the sampled light level; and
   decreasing the intensity of the display in response to occurrence of the threshold change resulting from an increase in the sampled light level.

7. The computer program product of claim 1, wherein the threshold change is 6 lux or greater.

8. A system for controlling an intensity of light emanating from a display positioned within a vehicle to display content to be viewed from outside of the vehicle, comprising:
   a display configured to be mounted in a vehicle;
   a light sensor configured to be mounted in the vehicle and configured to sense a light level in a localized area of the vehicle;
   a processor configured to send a signal to control an intensity of light emanating from the display; and
   a computer readable storage medium having computer readable program code embodied therein that when executed performs operations, the operations comprising:
      determining a first mode or a second mode based on a sampling of a light level within the vehicle;
      after the determining one of the first mode and the second mode, further sampling a light level within the vehicle more frequently during the second mode than during the first mode;
      determining whether a threshold change in the further sampled light level occurs when in the second mode; and
      adjusting an intensity of the display in response to occurrence of the threshold change.

9. The system of claim 8, wherein the determining the first mode or the second mode further comprises reading a clock time.

10. The system of claim 9, wherein the determining the first mode or second mode further comprises:
    determining the first mode when the read clock time is within a first clock time range and the sampled light level within the vehicle is within a first brightness range; and
    determining the second mode when the read clock time is within a second clock time range and the sampled light level within the vehicle is within a second brightness range, wherein the first brightness range has a higher brightness level than the second brightness range.

11. The system of claim 10, wherein the first clock time range indicates daytime hours and wherein the second clock time range indicates nighttime hours.

12. The system of claim 8, wherein the operations further comprise:
    holding the display at a constant intensity when in the first mode, wherein the further sampling the light level samples
    the light level within the vehicle a plurality of times when in the second mode, wherein the determining whether there is the threshold change and adjusting the intensity is performed each time the light level is sampled.

13. The system of claim 8, wherein the light sensor is separate from the display and configured to detect light emanating from the display and being reflected off of one or more surfaces in the vehicle and directed towards a driver in the vehicle.

14. A method for controlling an intensity of light emanating from a display positioned within a vehicle to display content to be viewed from outside of the vehicle; comprising:
    determining a first mode or a second mode based on a sampling of a light level within the vehicle;
    after the determining one of the first mode and the second mode, further sampling a light level within the vehicle more frequently during the second mode than during the first mode;

determining whether a threshold change in the further sampled light level occurs when in the second mode; and adjusting an intensity of the display in response to occurrence of the threshold change.

15. The method of claim 14, wherein the determining the first mode or the second mode further comprises reading a clock time.

16. The method of claim 15, wherein the determining the first mode or the second mode further comprises:

determining the first mode when the read clock time is within a first clock time range and the sampled light level within the vehicle is within a first brightness range; and determining the second mode when the read clock time is within a second clock time range and the sampled light level within the vehicle is within a second brightness range, wherein the first brightness range includes a greater brightness than the second brightness range.

17. The method of claim 16, wherein the first clock time range indicates daytime hours and wherein the second clock time range indicates nighttime hours.

18. The method of claim 14, further comprising:

holding the display at a constant intensity when in the first mode, wherein the further sampling the light level samples the light level within the vehicle a plurality of times when in the second mode, wherein the determining whether there is the threshold change and adjusting the intensity is performed each time the light level is sampled.

* * * * *